United States Patent
Suffin

(10) Patent No.: US 6,691,225 B1
(45) Date of Patent: Feb. 10, 2004

(54) METHOD AND APPARATUS FOR DETERMINISTICALLY BOOTING A COMPUTER SYSTEM HAVING REDUNDANT COMPONENTS

(75) Inventor: A. Charles Suffin, West Boylston, MA (US)

(73) Assignee: Stratus Technologies Bermuda Ltd., Hamilton (BM)

( * ) Notice: Subject to any disclaimer, the term of this patent is extended or adjusted under 35 U.S.C. 154(b) by 0 days.

(21) Appl. No.: 09/549,733

(22) Filed: Apr. 14, 2000

(51) Int. Cl.[7] ............................................. G06F 9/445
(52) U.S. Cl. ............................. 713/2; 709/222; 714/10
(58) Field of Search ........................ 713/1, 2; 709/222; 714/2, 3, 10, 11, 13

(56) References Cited

U.S. PATENT DOCUMENTS

| | | | |
|---|---|---|---|
| 3,192,362 A | 6/1965 | Cheney et al. ............... 235/153 |
| 3,533,065 A | 10/1970 | McGilvray ............... 340/172.5 |
| 3,533,082 A | 10/1970 | Schnabel ................. 340/172.5 |
| 3,593,307 A | 7/1971 | Gouge, Jr. ............... 340/172.5 |
| 3,665,173 A | 5/1972 | Bouricius et al. ........... 235/153 |
| 3,681,578 A | 8/1972 | Stevens ....................... 235/153 |
| 3,783,250 A | 1/1974 | Fletcher et al. ............. 235/153 |
| 3,879,712 A | 4/1975 | Edge et al. ............... 340/172.5 |
| 3,991,407 A | 11/1976 | Jordan, Jr. et al. ....... 340/172.5 |
| 4,030,074 A | 6/1977 | Giorcelli ..................... 364/200 |
| 4,099,234 A | 7/1978 | Woods et al. ................ 364/200 |
| 4,176,258 A | 11/1979 | Jackson ....................... 235/302 |
| 4,228,496 A | 10/1980 | Katzman et al. ............. 364/200 |
| 4,323,966 A | 4/1982 | Whiteside et al. .......... 364/200 |
| 4,356,550 A | 10/1982 | Katzman et al. ............. 364/200 |
| 4,358,823 A | 11/1982 | McDonald et al. ......... 364/200 |
| 4,366,535 A | 12/1982 | Cedolin et al. ............. 364/200 |
| 4,375,683 A | 3/1983 | Wensley ....................... 371/36 |
| 4,377,000 A | 3/1983 | Staab ........................... 371/11 |
| 4,453,215 A | 6/1984 | Reid ............................ 364/200 |
| 4,484,273 A | 11/1984 | Stiffler et al. ............... 364/200 |
| 4,486,826 A | 12/1984 | Wolff et al. ................. 364/200 |
| 4,503,535 A | 3/1985 | Budde et al. ................. 371/11 |
| 4,507,784 A | 3/1985 | Procter ......................... 371/61 |
| 4,562,575 A | 12/1985 | Townsend ....................... 371/9 |
| 4,583,224 A | 4/1986 | Ishii et al. ..................... 371/36 |
| 4,589,066 A | 5/1986 | Lam et al. ................... 364/200 |
| 4,597,084 A | 6/1986 | Dynneson et al. ............. 371/51 |
| 4,610,013 A | 9/1986 | Long et al. ..................... 371/9 |
| 4,622,667 A | 11/1986 | Yount ............................. 371/9 |
| 4,644,498 A | 2/1987 | Bedard et al. ............... 364/900 |
| 4,648,031 A | 3/1987 | Jenner ......................... 364/200 |
| 4,654,857 A | 3/1987 | Samson et al. ............... 371/68 |
| 4,686,677 A | 8/1987 | Flora ............................ 371/61 |
| 4,736,377 A | 4/1988 | Bradley et al. ............... 371/37 |
| 4,739,498 A | 4/1988 | Eichhorn .................... 365/200 |
| 4,750,177 A | 6/1988 | Hendrie et al. ............... 371/32 |

(List continued on next page.)

FOREIGN PATENT DOCUMENTS

| | | | |
|---|---|---|---|
| EP | 0720094 A3 | 7/1996 | ........... G06F/11/00 |
| EP | 0720094 A2 | 7/1996 | ........... G06F/11/00 |
| WO | 99/60477 A1 | 11/1999 | ........... G06F/9/445 |

OTHER PUBLICATIONS

Annex to Form PCT/ISA/206 for International Application No. PCT/US 01/11990, mailed on Jan. 25, 2002.

*Primary Examiner*—Thomas M. Heckler
(74) *Attorney, Agent, or Firm*—Testa, Hurwitz & Thibeault, LLP

(57) ABSTRACT

A method for deterministically booting a computer system having redundant components includes the step of selecting hardware and software components. The selected components are booted in a manner consistent with traditional computer systems. If the boot fails, a different set of components is selected and an attempt is made to boot those components traditionally. In one embodiment, the hardware and software components are a processor and an input/output controller. A corresponding apparatus is also discussed.

33 Claims, 7 Drawing Sheets

U.S. PATENT DOCUMENTS

| | | | |
|---|---|---|---|
| 4,799,140 A | 1/1989 | Dietz et al. | 364/140 |
| 4,816,990 A | 3/1989 | Williams | 364/200 |
| 4,905,181 A | 2/1990 | Gregory | 364/900 |
| 4,907,232 A | 3/1990 | Harper et al. | 371/36 |
| 4,916,695 A | 4/1990 | Ossfeldt | 371/9.1 |
| 5,020,024 A | 5/1991 | Williams | 364/900 |
| 5,089,958 A | 2/1992 | Horton et al. | 395/575 |
| 5,136,704 A | 8/1992 | Danielsen et al. | 395/575 |
| 5,155,809 A | 10/1992 | Baker et al. | 395/200 |
| 5,157,663 A | 10/1992 | Major et al. | 371/9.1 |
| 5,168,555 A * | 12/1992 | Byers et al. | 713/2 |
| 5,193,180 A | 3/1993 | Hastings | 395/575 |
| 5,220,668 A | 6/1993 | Bullis | 395/650 |
| 5,231,640 A | 7/1993 | Hanson et al. | 371/68.3 |
| 5,247,522 A | 9/1993 | Reiff | 371/29.5 |
| 5,249,187 A | 9/1993 | Bruckert et al. | 371/68 |
| 5,263,034 A | 11/1993 | Guenthner et al. | 371/68.3 |
| 5,270,699 A | 12/1993 | Signaigo et al. | 340/825.01 |
| 5,271,023 A | 12/1993 | Norman | 371/68.3 |
| 5,295,258 A | 3/1994 | Jewett et al. | 395/575 |
| 5,313,627 A | 5/1994 | Amini et al. | 395/575 |
| 5,317,726 A | 5/1994 | Horst | 395/575 |
| 5,321,706 A | 6/1994 | Holm et al. | 371/51.1 |
| 5,333,265 A | 7/1994 | Orimo et al. | 395/200 |
| 5,357,612 A | 10/1994 | Alaiwan | 395/200 |
| 5,361,267 A | 11/1994 | Godiwala et al. | 371/40.1 |
| 5,379,381 A | 1/1995 | Lamb | 395/275 |
| 5,392,302 A | 2/1995 | Kemp et al. | 371/51.1 |
| 5,404,361 A | 4/1995 | Casorso et al. | 371/40.1 |
| 5,423,024 A | 6/1995 | Cheung | 395/575 |
| 5,430,866 A | 7/1995 | Lawrence et al. | 395/575 |
| 5,537,535 A | 7/1996 | Maruyama et al. | 395/183.01 |
| 5,586,253 A | 12/1996 | Green et al. | 395/185.06 |
| 5,600,784 A | 2/1997 | Bissett et al. | 395/182.1 |
| 5,615,403 A | 3/1997 | Bissett et al. | 395/881 |
| 5,621,885 A | 4/1997 | Del Vigna, Jr. | 395/182.11 |
| 5,659,748 A * | 8/1997 | Kennedy | 713/2 |
| 5,694,541 A | 12/1997 | Service et al. | 395/183.22 |
| 5,781,910 A | 7/1998 | Gostanian et al. | 707/201 |
| 5,787,485 A | 7/1998 | Fitzgerald et al. | 711/162 |
| 5,790,397 A | 8/1998 | Bissett et al. | 364/131 |
| 5,802,265 A | 9/1998 | Bressoud et al. | 395/182.09 |
| 5,845,060 A | 12/1998 | Vrba et al. | 395/182.1 |
| 5,896,523 A | 4/1999 | Bissett et al. | 395/551 |
| 5,956,474 A | 9/1999 | Bissett et al. | 395/182.09 |
| 5,968,185 A | 10/1999 | Bressoud et al. | 714/10 |
| 5,983,371 A | 11/1999 | Lord et al. | 714/55 |
| 6,038,685 A | 3/2000 | Bissett et al. | 714/12 |
| 6,263,452 B1 | 7/2001 | Jewett et al. | 714/11 |
| 6,327,675 B1 | 12/2001 | Burdett et al. | 714/11 |
| 6,393,582 B1 | 5/2002 | Klecka et al. | 714/11 |

* cited by examiner

METHOD AND APPARATUS FOR DETERMINISTICALLY BOOTING A COMPUTER SYSTEM HAVING REDUNDANT COMPONENTS

FIELD OF THE INVENTION

The present invention relates to initialization processes for computers and, in particular, to an initialization process for a redundant system that boots deterministically.

BACKGROUND OF THE INVENTION

Information systems are evolving to become the delivery mechanism that drives corporate revenues. In industries ranging from financial services to on-line shopping, the computer has become the business. Accordingly, protection of computer-based data is becoming of paramount importance to a corporation's financial well being.

Fault-tolerant systems offer superior reliability characteristics through the use of redundant components and data paths that insure uninterrupted delivery of service. Even so, such systems may still fail due to hardware or software errors. In such a situation, it is often difficult to troubleshoot a fault-tolerant system due to the multiplicity of hardware units provided. For example, since a redundant, fault-tolerant system may include multiple CPUs, a single misbehaving central processing unit may sometimes boot properly, masking a system error and causing the error to be irreproducible. In these cases, the system cannot be examined to determine the cause of the failure.

SUMMARY OF THE INVENTION

The present invention provides a method and apparatus for booting a computer system with redundant hardware and/or software components in a deterministic fashion. Individual hardware and/or software components are selected and a boot process is performed using those selected components. Booting in this manner allows application programs written for traditional machine to be used without modification. Further, modifications to boot software are rendered minimal or non-existent using this scheme. Moreover, booting individual processor-I/O controller pairs allows system faults to be isolated and detected in a deterministic fashion.

In one aspect, the present invention relates to a method for deterministically booting a fault-tolerant computer having a plurality of processors and one or more input-output controllers. A first processor/input-output controller pair is chosen and an attempt is made to boot the chosen pair. In the event that the attempt to boot the chosen pair fails, a new boot pair is selected.

In another aspect, the present invention relates to a method for deterministically booting a fault-tolerant computer having a plurality of processor boards and one or more input-output controller boards. A first processor/input-output controller board pair is chosen and an attempt is made to boot the chosen board pair. In the event that the attempt to boot the chosen board pair fails, a new boot pair is selected.

In still another aspect, the present invention relates to an apparatus for deterministically booting a fault-tolerant system. The apparatus includes a plurality of processors, at least one input-output controller in communication with the processors, a memory element storing a list of processor/controller pairs, and a control module in communication with each element. The control module retrieves a first processor/controller pair identifier from the memory element and attempts to boot the processor/controller pair identified. In the event that the boot attempt fails, a second identifier is retrieved from the memory element and an attempt is made to boot the second boot pair identified.

In yet another aspect, the present invention relates to an apparatus for deterministically booting a fault-tolerant system composed of individual hardware or software objects. A set of hardware and/or software components is selected and a boot process is performed using this set of components. In the event that the boot fails, a new boot set is selected.

BRIEF DESCRIPTION OF THE DRAWINGS

The invention is pointed out with particularity in the appended claims. The advantages of the invention described above, as well as further advantages of the invention, may be better understood by reference to the following description taken in conjunction with the accompanying drawings, in which:

DETAILED DESCRIPTION OF THE INVENTION

Figure 1:
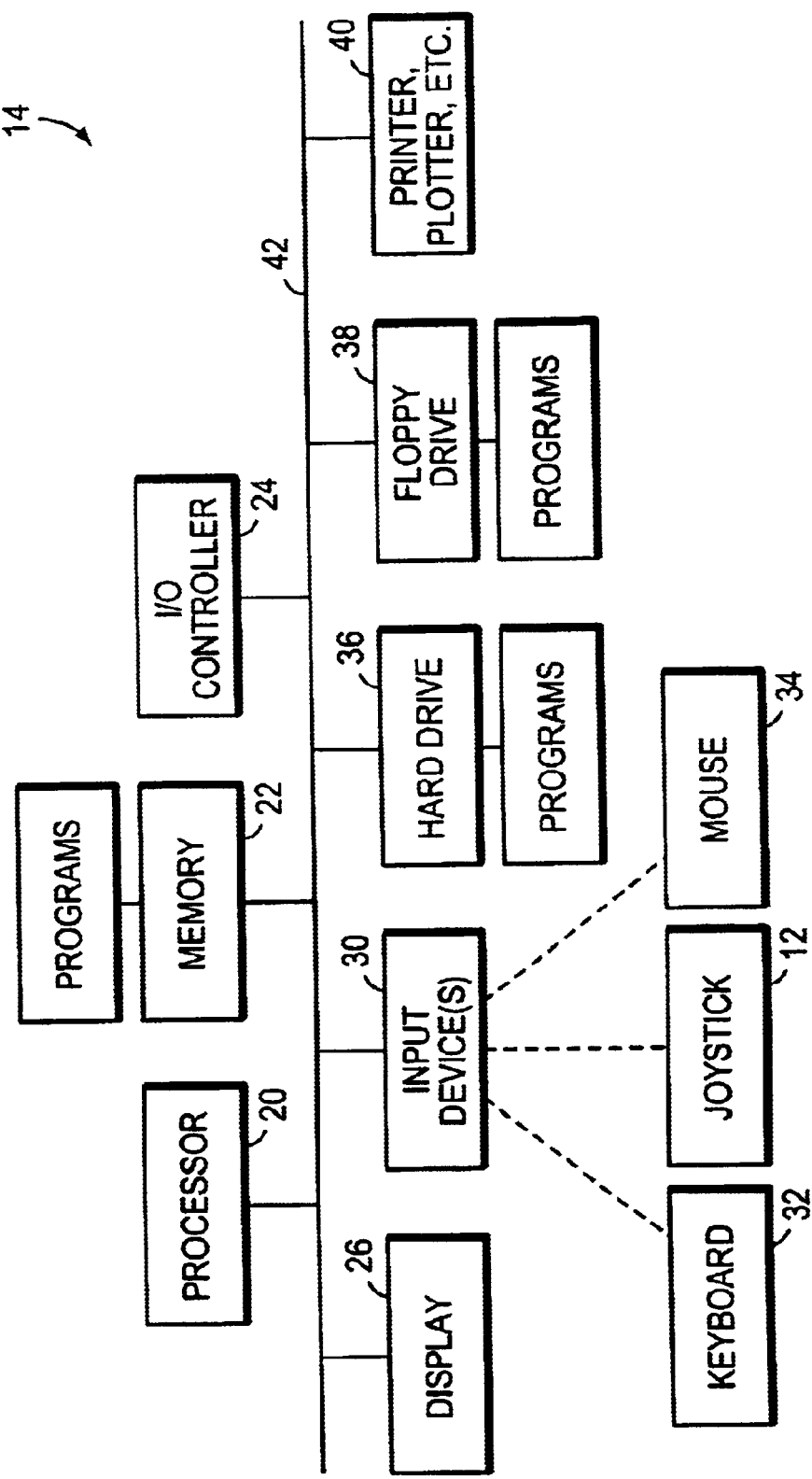
FIG. 1 is a block diagram of an embodiment of a traditional computer system.

Referring now to FIG. 1, a typical computer 14 as known in the prior art includes a central processor 20, a main memory unit 22 for storing programs and/or data, an input/output (I/O) controller 24, a display device 26, and a data bus 42 coupling these components to allow communication between these units. The memory 22 may include random access memory (RAM) and read only memory (ROM) chips. The computer 14 typically also has one or more input devices 30 such as a keyboard 32 (e.g., an alphanumeric keyboard and/or a musical keyboard), a mouse 34, and, in some embodiments, a joystick 12.

The computer 14 typically also has a hard disk drive 36 and a floppy disk drive 38 for receiving floppy disks such as 3.5-inch disks. Other devices 40 also can be part of the computer 14 including output devices (e.g., printer or plotter) and/or optical disk drives for receiving and reading digital data on a CD-ROM. In the disclosed embodiment, one or more computer programs define the operational capabilities of the system 10. These programs can be loaded onto the hard drive 36 and/or into the memory 22 of the computer 14 via the floppy drive 38. Applications may be caused to run by double clicking a related icon displayed on the display device 26 using the mouse 34. In general, the controlling software program(s) and all of the data utilized by the program(s) are stored on one or more of the computer's storage mediums such as the hard drive 36, CD-ROM 40, etc.

System bus 42 allows data to be transferred between the various units in the computer 14. For example, processor 20 may retrieve program data from memory 22 over system bus 42. Various system busses 42 are standard in computer systems 14, such as the Video Electronics Standards Association Local Bus (VESA Local Bus), the industry standard architecture ISA bus (ISA), the Extended Industry Standard Architecture bus (EISA), the Micro Channel Architecture bus (MCA) and the Peripheral Component Interconnect bus (PCI). In some systems 14 multiple busses may be used to provide access to different units of the system. For example, a system 14 may use a PCI to connect a processor 20 to peripheral devices 30, 36, 38 and concurrently connect the processor 20 to main memory 22 using an MCA bus.

It is immediately apparent from FIG. 1 that such a traditional computer system 14 is highly sensitive to any single point of failure. For example, if main memory unit 22 fails to operate for any reason, the computer 14 as a whole will cease to function. Similarly, should system bus 42 fail, the system 14 as a whole will fail. A redundant, fault-tolerant system achieves an extremely high level of availability by using redundant components and data paths to insure uninterrupted operation. A redundant, fault-tolerant system may be provided with any number of redundant units. Configurations include dual redundant systems, which include duplicates of certain hardware units found in FIG. 1, and triply redundant configurations, which include three of each unit shown in FIG. 1. In either case, redundant central processing units 20 and main memory units 22 run in "lock step," that is, each processor runs identical copies of the operating system and application programs. The data stored in replicated memory 22 and registers provided by the replicated processors 20 should be identical at all times.

Figure 2:
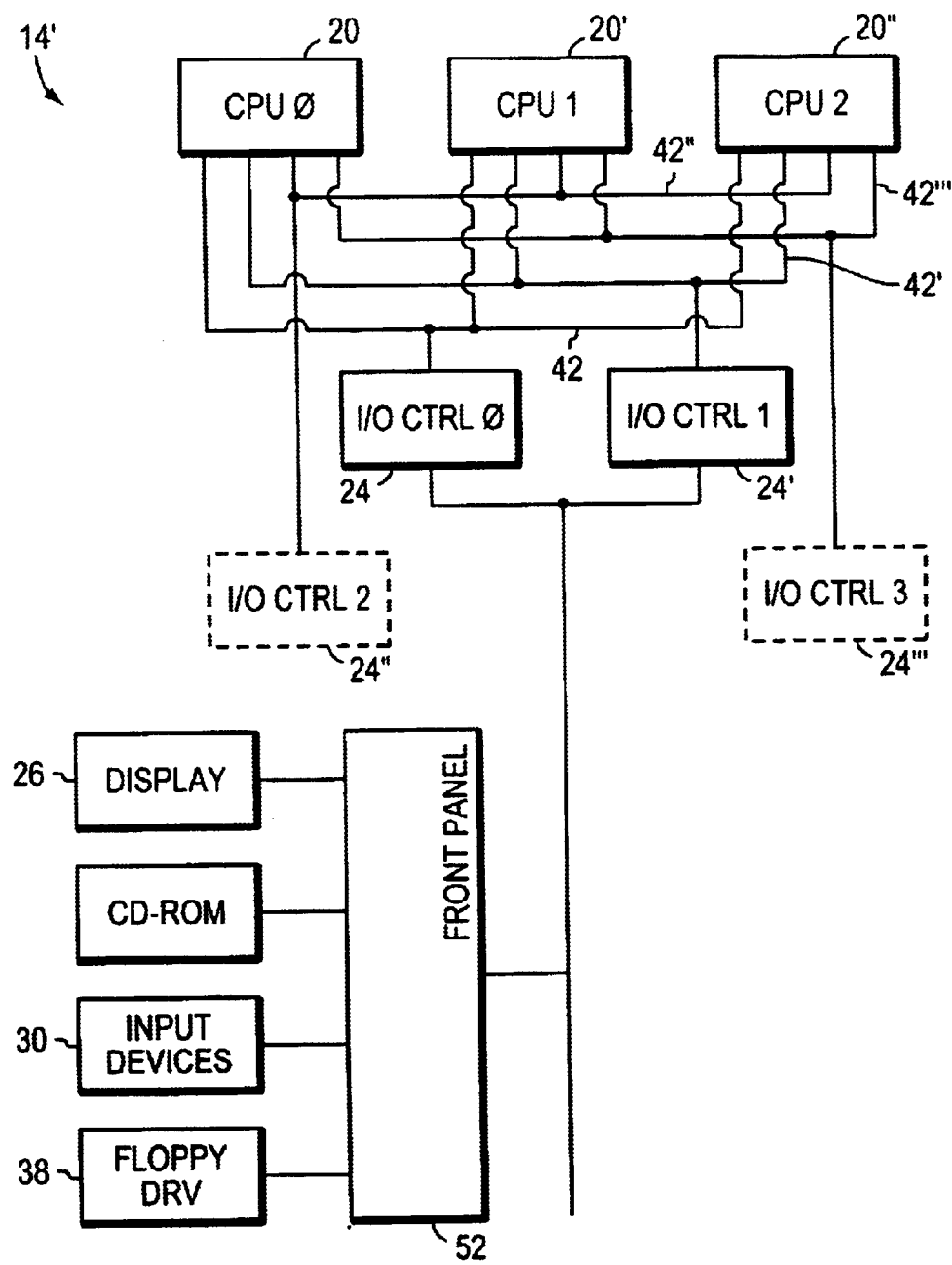
FIG. 2 is a block diagram of an embodiment of a redundant, fault-tolerant computer system.

Referring now to FIG. 2, one embodiment of a redundant, fault-tolerant system 14' is shown that includes three processors 20, 20', 20" (generally 20) and at least two input output controllers 24, 24' (generally 24). As shown in FIG. 2, system 14' may include more than two input output controllers (24" and 24'" shown in phantom view) to allow the system 14' to control more I/O devices. In the embodiment shown in FIG. 2, four redundant system busses 42, 42', 42" and 42'" (generally 42) are used to interconnect each processor 20 and I/O controllers 24. In one embodiment, processors 20 are selected from the "x86" family of processors manufactured by Intel Corporation of Santa Clara, Calif. The x86 family of processors includes the 80286 processor, the 80386 processor, the 80486 processor, and the Pentium, Pentium II, Pentium III, and Xeon processors. In another embodiment processors are selected from the "680x0" family of processors manufactured by Motorola Corporation of Schaumburg, Ill. The 680x0 family of processors includes the 68000, 68020, 68030, and 68040 processors. Other processor families include the Power PC line of processors manufactured by the Motorola Corporation, the Alpha line of processors manufactured by Compaq Corporation of Houston, Tex., and the Crusoe line of processors manufactured by Transmeta Corporation of Santa Clara, Calif.

Each processor 20 may include logic that implements fault-tolerant support. For embodiments in which CPU 20 is a single chip, the fault-tolerant logic may be included on the chip itself. In other embodiments, the CPU 20 is a processor board that includes a processor, associated memory, and fault-tolerant logic. In these embodiments, the fault-tolerant logic can be implemented as a separate set of logic on processor board 20. For example, the fault-tolerant logic may be provided as an application specific integrated circuit (ASIC), a field programmable gate array (FPGA), an electrically erasable programmable read-only memory (EEPROM), a programmable read-only memory (PROM), a programmable logic device (PLD), or a read-only memory device (ROM). The fault-tolerant logic compares the results of each operation performed by the separate processors 20 to the results of the same operation performed on one of the other processors 20. If a discrepancy is determined then a failure has occurred.

Each input output controller may also include fault-tolerant logic that monitors transactions on the system busses 42 to aid in determining a processor failure. As shown in FIG. 2, the I/O controller boards 24 also provide support for the display 26, input devices 30 and mass storage such as floppy drives 38, hard drives, and CD-ROM devices. The embodiment shown in FIG. 2 includes a front panel 52 that provides an interface to these input and output devices. In these embodiments, the front panel may serve as an adapter between the I/O controllers 24 and, for example, a universal serial bus (USB) used by keyboard and mouse input devices, or a video connector (EGA, VGA, or SVGA) used for connecting displays to the system 14'.

Each I/O controller 24 includes service management logic which performs various system management functions, such as: monitoring the operational status of the system; performing on-line diagnostics of the system; and providing an interface for remotely viewing system operation (including a processor boot sequence). In some embodiments, the service management logic includes a modem providing a serial line connection to a service network. In other embodiments, the service management logic includes a connection for communicating with other customer equipment, such as an Ethernet connection of other local area network connection. In some embodiments, the service management logic is provided as a separate board that is in communication with I/O controller 24. In one particularly preferred embodiment, a service management board including all service management logic connects to I/O controller 24 via a PCI slot. The service management logic (referred to hereafter as SML) may be provided with a power supply separate from the remainder of the system 14'.

Figure 3:
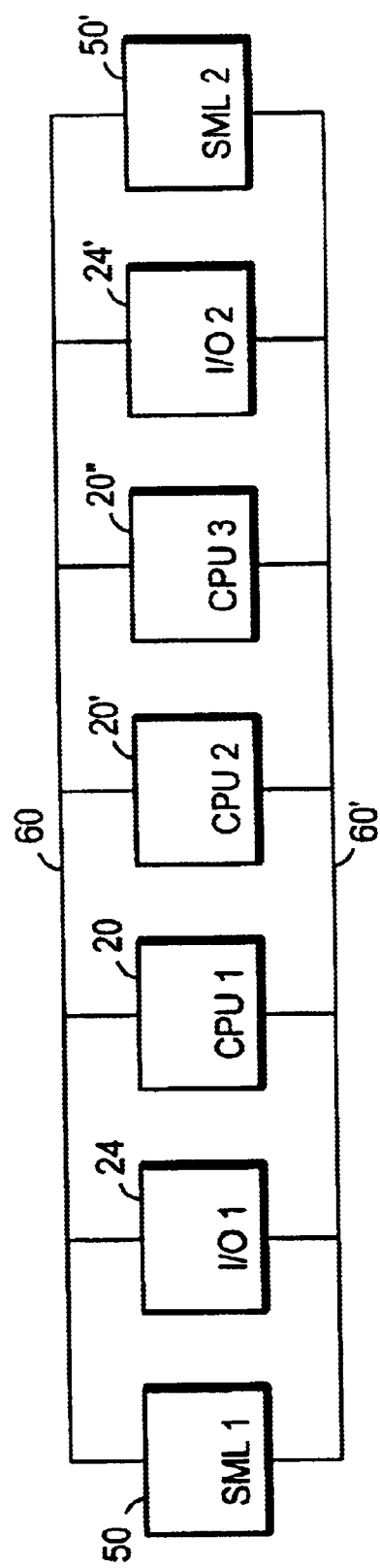
FIG. 3 is a block diagram showing an embodiment of auxiliary connections between service management logic units, processors, and I/O controllers in the system of FIG. 2.

Referring now to FIG. 3, a block diagram shows the connection between SML units 50, 50' (generally 50) and the I/O controllers 24, 24' and processors 20, 20', 20" of the system 14'. As shown by FIG. 3, each SML 50 is connected to each of the other units by redundant auxiliary busses 60, 60' in addition to redundant busses 42. Auxiliary busses 60, 60'may be any bus that allows the SMLs 50 to control and query the processors 20 and I/O controllers 24. The SMLs can communicate with the other units using a variety of connections including twisted pair, broadband connections, or wireless connections. Connections can be established using a variety of lower layer communication protocols such as TCP/IP, IPX, SPX, Ethernet, RS232, direct asynchronous connections, or I$^2$C. In general, any message-oriented protocol may be used, and a check-summed, packet-oriented protocol is preferred.

Figure 4:
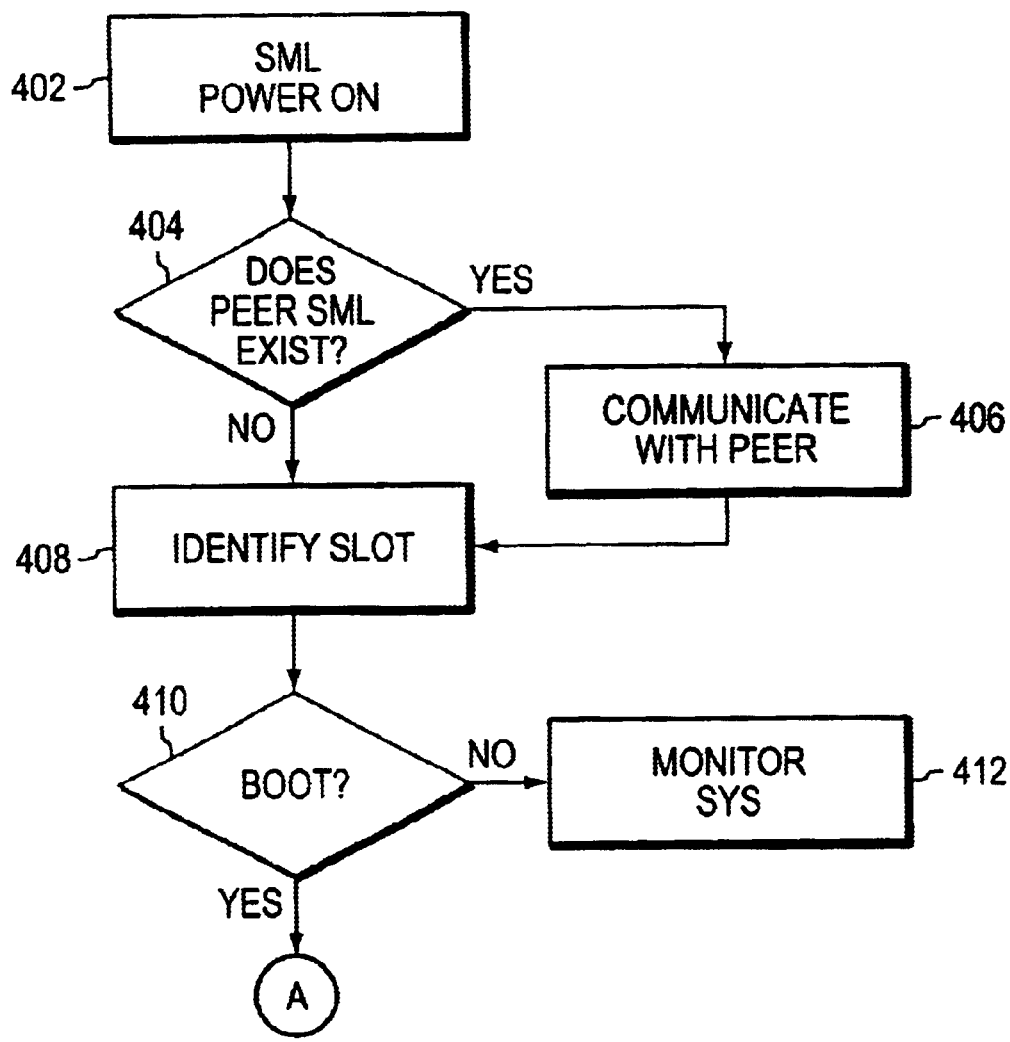
FIGS. 4 and 4A are block diagrams depicting an embodiment of the steps to be taken during initialization of a fault-tolerant computer system.

Referring now to FIG. 4, the steps to be taken to boot a redundant, fault-tolerant system are shown. In brief overview, the boot process begins by powering on the SMLs (step 402), initializing and communicating with other SMLs in the system (steps 404, 406 and 408), and determining whether or not the system requires booting (step 410).

In greater detail, and as noted above, SMLs 50 are provided with power separate from the power provided to the system 14'. Power is supplied to the SMLs (step 402) before any other units in the system 14'. For embodiments in which the SML is a portion of an I/O controller board 24, power may be supplied to the entire I/O controller board 24 but only routed to the SML portion of the controller board 24. For embodiments in which the SML is provided as a separate board, then only the SML is supplied with power. In either case, whether and when power is supplied to the other units in the system is under the direct control of the SML.

A SML uses auxiliary busses 60, 60' to determine if other SMLs exist in the system (step 404). If so, the SMLs exchange messages over the auxiliary busses 60, 60' in order to determine which SML will function as the primary SML for the system 14' (step 406). The determination of which SML will function as the primary SML may include many factors, including: whether or not a service management logic unit has been previously inserted in the system to be powered up; and whether another SML has already been powered up and is operational. In other embodiments, the identity of the primary SML may be "hardwired."

If an SML 50 determines that no other SML exists in the system 14', or if an SML 50 has determined that it will function as the primary SML 50 for a system 14' with multiple SMLs, the SML identifies with which I/O controller 24 it is associated (step 408). The SML 50 uses this information during the boot process to determine if another SML 50 should act as the primary SML 50 during the boot process. For example, if the I/O controller with which the SML 50 is associated is not selected for booting, then the SML 50 associated with the booting I/O controller must act as the primary SML 50 for the boot attempt. In other words, BIOS heartbeat and other boot status messages will be directed to the SML 50 on the booting I/O controller, even if that SML 50 is not the primary SML 50.

Once an SML determines that it is the primary SML for a system 14', it determines whether or not to boot the system 14'. SMLs 50 can exchange messages to negotiate which SML 50 is the primary SML 50. If an SML 50 is already functioning in the system as primary, then a peer SML 50 becomes secondary. If neither SML 50 has yet been identified as the primary SML 50, the SMLs 50 negotiate to determine which SML 50 is the primary SML 50. In one embodiment the SMLs 50 negotiate to determine which SML 50 is the primary SML 50. In one embodiment, the SMLs 50 negotiate using the following rules:

1. If one SML 50 is "alien" to the system then the SML 50 which is not alien becomes primary. "Alien" means that the SML 50 was not resident in the computer system the last time it was used.

2. If one SML 50 was primary more recently than the other, it becomes the primary again (and the other becomes secondary).

3. As a default, the SML 50 in I/O board slot 0 becomes the primary SML 50.

The SML 50 in I/O board slot 1 becomes secondary. A service management logic unit, in this embodiment, will not boot the system if it was explicitly shut down by an administrator (for example, if the administrator used a "power off" command to shut down the system). Whether or not a system has been explicitly shut down by an administrator may be stored in non-volatile memory (not shown in the drawings) that the SML 50 may query.

If a SML 50 determines that it should not boot the system 14', it transitions to a state in which it monitors the system (step 412). This state is described in greater detail below. For example, an SML 50 may query a non-volatile memory element and discover that the system 14' was properly and explicitly shut down by an administrator. In this case, the SML 50 will not attempt to boot the system 14'. Otherwise, the system moves to the boot process described in FIG. 4A.

Figure 4A:
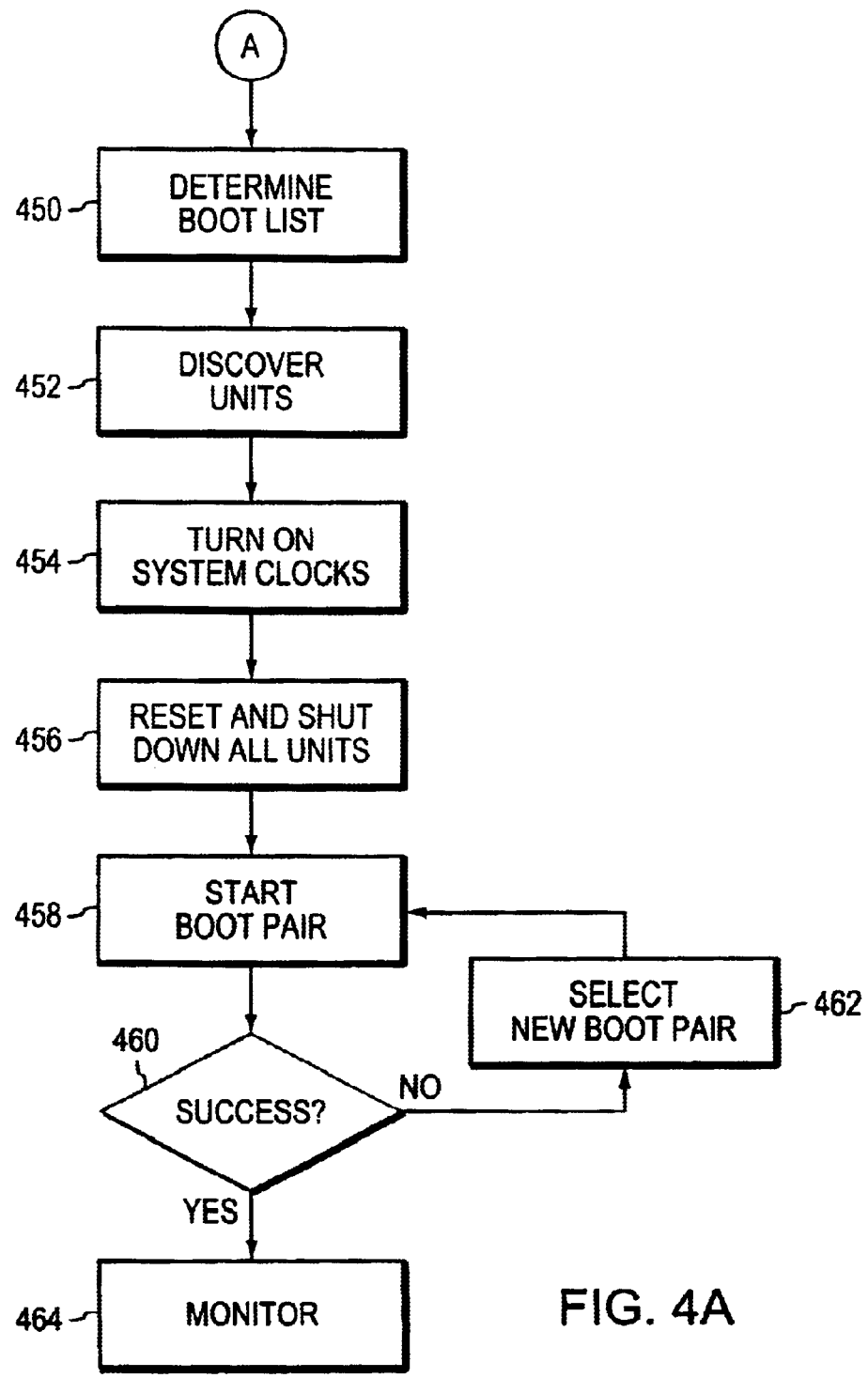
Figure 5A:
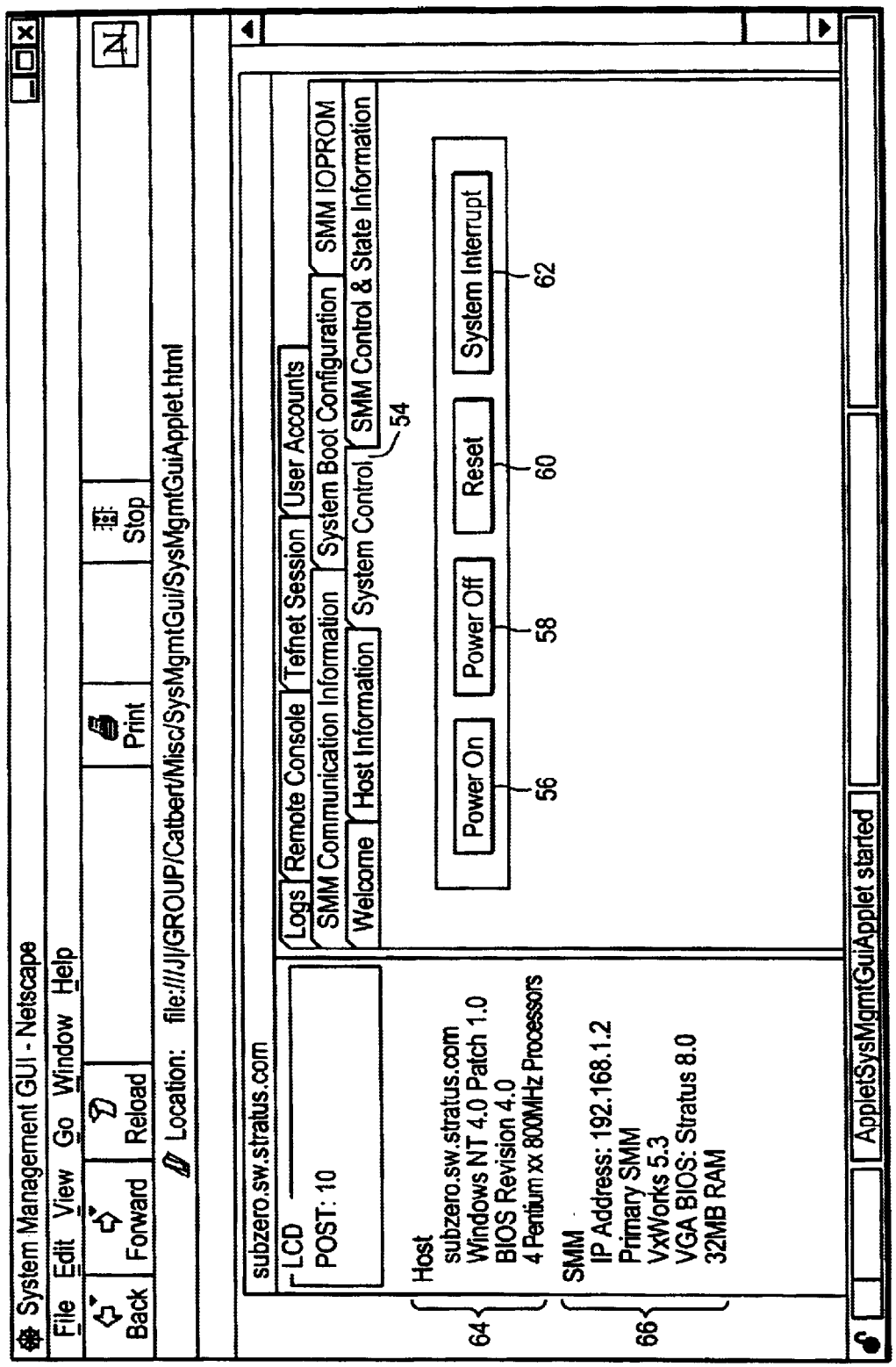
FIGS. 5A and 5B are screen shots depicting exemplary embodiments of user interfaces for controlling the booting process.

The boot process shown in FIG. 4A may be commenced by an initializing SML 50. Alternatively, the boot process may be directly invoked by a system administrator by, for example, a "boot" command. FIG. 5A is a screen shot showing an exemplary embodiment for providing such commands to the system administrator by the primary SML 50. In this embodiment, system administration commands are grouped as a set of "tabs" and displayed to the administrator. The administrator selects the tab containing the desired operations. FIG. 5A depicts an embodiment in which a "System Control" tab 54 provides four controls for a system: a "Power On" command 56 (depicted in gray to indicate the system is currently running; an explicit "Power Off" command 58; a "Reset" command 60; and a "System Interrupt" command 62. System information 64, as well as information concerning the primary SML 66, is provided to the administrator. In the embodiment shown in FIG. 5A, the administration commands are provided using a browser-based user interface. Although FIG. 5A depicts an embodiment using NETSCAPE NAVIGATOR, manufactured by Netscape Communications of Mountain View, Calif., any browser may be used, including MICROSOFT INTERNET EXPLORER, manufactured by Microsoft Corporation of Redmond, Wash. A third way for the boot process shown in FIG. 4A to be invoked is by an SML following a system failure. This mechanism is discussed in greater detail below.

The boot process begins by determining a "boot list" (step 450) FIG. 4A. A boot list is a list of component systems allowing the system to boot. For example, boot components may include processors, I/O controllers, BIOS, and other software (both application and system). In one particular embodiment, a boot list an ordered list of processor-I/O controller pairs. In some embodiments, the boot list includes "heartbeat" values associated with each boot pair. Heartbeat values are used by an SML 50 during system operation to determine if a processor 20 is functioning properly. Heartbeats are described in greater detail below. The boot list may be stored in a data structure that associates processor identification values with I/O controller values. For embodiments in which heartbeat values are also stored, the data structure includes an additional field to associate heartbeat timer values with each boot pair. The data structure may be stored on each SML 50 in a system 14'. In preferred embodiments, the data structure is stored in an non-volatile, erasable memory element, such as an EEPROM, that is accessible using auxiliary busses 60, 60'. In the event that the stored data structure is inconsistent (for example the data structure may include corrupted data values), or if the SML 50 is unable to retrieve data from the memory element (for example, if no memory element exists or if both auxiliary busses 60, 60' are not functioning), the SML 50 may use a hard-coded default list.

Figure 5B:
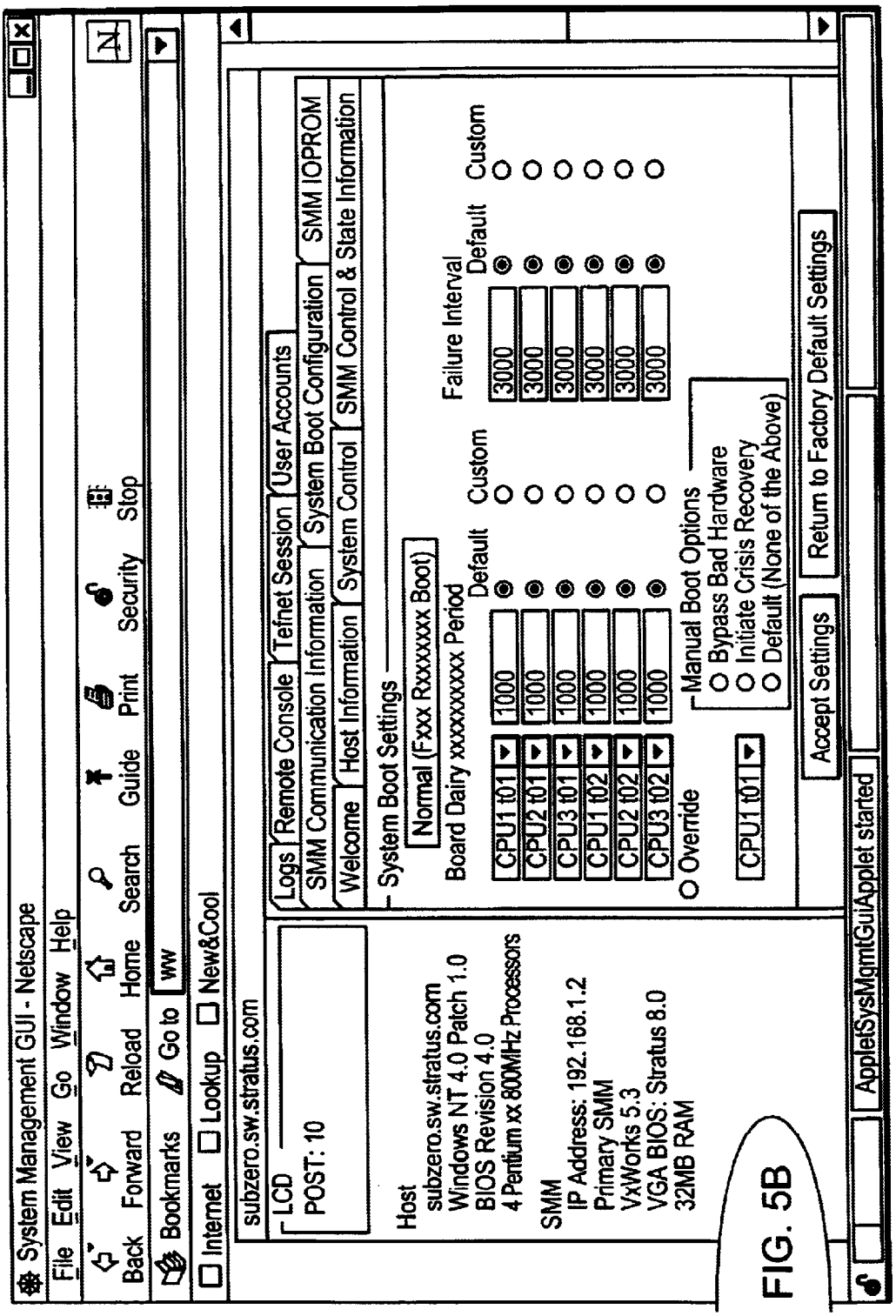

FIG. 5B depicts a screen shot of an exemplary user interface allowing a system administrator to modify the default boot list. As shown in connection with FIG. 5A, the user interface is browser based and provides information to the administrator regarding the system 14' and SML 50 currently active. Once the graphical user interface shown in FIG. 5B is used to create a boot list, it is saved to the non-volatile memory element.

In one embodiment, once a boot list is determined, whether by retrieving a list from a memory element or by using a default list, the SML 50 determines available processors 20 and I/O controllers 24 (step 452). The SML 50 may transmit a message over auxiliary busses 60, 60' to determine this information. Processors 20 and I/O controller 24 respond to the message transmitted by the SML 50. The SML 50 concludes that a processor 20 or I/O controller does not exist if no response to the message is received on either bus 60, 60'. This information is used by the SML 50 to skip pairs in the boot list if they reference units not present in the system 14'.

Once all system units are discovered by the SML 50, the SML 50 provides system clocks o the processors 20 and the I/O controllers 24 (step 452). In other embodiments system clocks are not under the control of the SML 50 and, in these embodiments, step 452 may be skipped.

Using auxiliary busses 60, 60', the SML 50 asserts a reset signal associated with each processor 20 and I/O controller 24 (step 456). The SML 50 takes any other steps necessary at this point to prepare all system units for booting. For example, some units may need to have power applied or, for example, certain other signals may need to be asserted to prepare the unit for booting.

The SML releases reset from the processor 20 and the I/O controller 24 identified in the boot list as the first boot pair while holding reset active for all other system units (step 458). This allows the selected boot pair to boot in a manner consistent with a traditional computer. The SML 50 monitors the boot process of the selected boot pair to determine if the boot process is successful (step 460). In one embodiment, the SML 50 monitors the progress of the boot process by receiving heartbeat signals from the booting process-I/O controller pair. In one embodiment, heartbeats are transmitted over system busses 40. Failure to receive a heartbeat signal within a predetermined time period indicates that the boot process has failed. If the boot process is not successful, the SML 50 selects a new boot pair from the boot list (step 462) and attempts to boot that processor-I/O controller pair. In some embodiments, the Basic Input-Output System (BIOS) may, during the boot attempt, determine that it cannot achieve a proper boot of the operating system, even though the processor has booted and is providing heartbeat signals to the SML 50. In this case, the BIOS issues an explicit "reboot" command to the SML 50 and the SML 50 selects a new boot pair from the boot list.

If the SML 50 cycles through every pair identified in the boot pair list and none of the pairs is successful, the SML 50 indicates that the system 14' was unable to boot. In some embodiments the SML 50 removes all power from the processors 20 and the I/O controllers 24 after determining the system 14' is unable to boot.

If the boot process is successful, the BIOS transmits a message to the SML indicating that the operating system has booted properly. In this case, the SML transitions to a monitoring state (step 464). In some embodiments, after successfully booting the first processor-I/O pair the SML 50 boots each other processor 20 in the system 14'.

Once the booting process is complete, or if the SML 50 determines that the system 14' should not be booted, the SML 50 enters a monitoring state (steps 412 or 464). In this state the SML 50 monitors heartbeat signals from each of the processors 20 to determine operation status of the system 14'. A failure to receive a heartbeat signal from a processor 20 during a predetermined period indicates that a failure has occurred. In this event, the SML 50 consults a non-volatile memory element to determine what actions, if any to take. The memory element may be the same memory element discussed above that stores the boot list, or a separate memory element may be provided that is accessible via the auxiliary busses 60, 60'. In one embodiment, the memory element stores a value that indicates one of seven actions for the SML 50 to take upon heartbeat failure: (1) no action; (2) normal interrupt; (3) non-maskable interrupt; (4) stop processor from executing; (5) system reboot; or (6) deterministic boot. Each of these options is discussed in detail below.

A memory value indicating that the SML 50 should take no action on a heartbeat failure disables all recovery mechanisms. In some embodiments, the SML 50 logs the failure but otherwise does nothing.

A memory value indicating "normal interrupt" restricts recovery attempts by the SML 50 to issuing normal interrupts to the processor 20 or processors 20 that have ceased to transmit a heartbeat. In this embodiment, the SML 50 issues an interrupt to a target processor 20 via the auxiliary busses 60, 60'. If the processor's operating system is able to process the interrupt, it responds by restarting heartbeat transmission. In some embodiments, the operating system ensures that lockstep processing is resumed. In other embodiments, the SML 50 issues interrupts to the processor or processors such that the processors resume lockstep operation. For example, interrupts may be issued to processors simultaneously which should avoid breaking lockstep. In some embodiments the operating system halts execution of all programs and allows a system administrator to debug system settings. If the operating system does not respond to the interrupt, then recovery fails. In some embodiments, the SML 50 simply logs this failure. In other embodiments, the SML 50 alerts an administrator that the system 14' will not respond.

A memory value indicating "non-maskable interrupts" restricts recovery attempts by the SML 50 to issuing normal and non-maskable interrupts to the processor 20 or processors 20 that have ceased to transmit a heartbeat. In this embodiment, should the system 14' refuse to respond to a normal interrupt, the SML 50 issues a non-maskable interrupt to a target processor 20 via the I/O controller 24. If multiple processors 20 are hung, non-maskable interrupts are issued to all processors 20 in lockstep to avoid breaking processor lockstep. If the processor's operating system is able to process the non-maskable interrupt, it responds by restarting heartbeat transmission. In this case, the SML 50 must revoke the previously issued normal interrupt. In some embodiments the operating system halts execution of all programs and allows a system administrator to debug system settings. If the operating system does not respond to the non-maskable interrupt, then recovery fails. In some embodiments, the SML 50 simply logs this failure. In other embodiments, the SML 50 alerts an administrator that the system 14' will not respond.

A memory value indicating that processor execution should be suspended allows the SML 50, in the event that a non-maskable interrupt fails to restore system operation, to select a processor 20 and suspend execution of all applications and the operating system by that processor 20. Processor and memory state of the suspended processor is not destroyed. If heartbeat signals resume from the other processors once the selected processor 20 is suspended, recovery has been successful. The state of the suspended processor 20 may be dumped for analysis, the state of the suspended processor may be replaced with state from one of the operational processors 20, or both. If this step fails to restore the system 14' to operational status, the SML 50 may dump the state of the suspended processor 20 for analysis by a system administrator, log the failure, alert an administrator to the failure, or any combination of these actions.

A memory value indicating "system reboot" allows the SML 50 to attempt to reboot the system in the event that suspended a selected processor 20 does not succeed. The reboot process is similar to the reboot process described in connection with FIGS. 4 and 4A, except that the suspended processor 20 is skipped during reboot of the boot pairs listed in the boot list. To avoid repetitive heartbeat failure, the SML 50 maintains an index to identify the last processor-I/O boot pair in the boot list that last rebooted successfully. During the reboot process, this index is incremented to ensure that a different pair is selected as the starting pair each time. If successful, the state of the suspended processor 20 may be dumped for analysis, the state of the suspended processor 20 may be replaced with the state of one of the operational processors, or both. As above, if this mechanism doesn't succeed in restoring the system 14' to operational status, the SML 50 may dump the state of the suspended processor 20 for analysis by a system administrator, log the failure, alert an administrator to the failure, or any combination of these actions. A memory value indicating "deterministic boot" allow the SML 50 to abandon the state of the suspended board and perform a full deterministic reboot, as described in connection with FIGS. 4 and 4A.

Having described certain embodiments of the invention, it will now become apparent to one of skill in the art that other embodiments incorporating the concepts of the invention may be used. Therefore, the invention should not be limited to certain embodiments, but rather should be limited only by the spirit and scope of the following claims.

What is claimed is:

1. In a fault-tolerant system including at least one processor and at least one input-output controller module, a method for deterministically booting the system, the method comprising the steps of:

(a) accessing a memory element storing a predefined list of potential processor/module pairs;

(b) choosing a first processor/input-output controller module pair comprising a first processor and a first input/output controller module; and (c) booting said first processor/module pair.

2. The method of claim 1 further comprising the step of (d) booting each of other processors.

3. The method of claim 1 wherein step (c) comprises executing a basic input/output system to boot the first processor.

4. The method of claim 1 further comprising the steps of:

(d) detecting that the first processor/module pair failed to boot;

(e) selecting a second processor/module pair comprising a second processor and the first input-output controller module; and (f) booting the second processor/module pair.

5. The method of claim 1 further comprising, before step (a), the steps of:

(a-1) identifying a non-responsive processor;

(a-2) selecting a second processor;

(a-3) halting execution of the selected second processor;

(a-4) restarting the non-responsive processor;

(a-5) restarting the selected second processor; and (a-6) copying processor state from the selected second processor to the non-responsive processor.

6. The method of claim 5 wherein step (a-1) comprises the steps of:

monitoring a heartbeat signal from a processor; and identifying the processor as non-responsive based on the heartbeat signal.

7. The method of claim 5 wherein step (a-6) comprises:

comparing between the processor state of the non-responsive processor and the selected halted processor to identify processor state differences; and copying a subset of the processor state of the selected halted processor to the non-responsive processor in order to make the state of the non-responsive processor identical to the state of the selected halted processor.

8. The method of claim 5 wherein step (a-4) comprises rebooting the non-responsive processor.

9. In a fault-tolerant system including at least one processor board and at least one input-output controller board, a method for deterministically booting the system, the method comprising the steps of:

(a) accessing a memory element storing a predefined list of potential processor board/controller board pairs;

(b) choosing a first processor board/controller board pair comprising a first processor board and a first input-output controller board; and (c) booting said first processor board/controller board pair.

10. The method of claim 9 further comprising the step of (d) booting each of other processor boards in the plurality of processor boards.

11. The method of claim 9 wherein step (c) comprises executing a basic input/output system to boot the first processor board.

12. The method of claim 9 further comprising the steps of:

(d) detecting that the first processor board/controller board pair failed to boot;

(e) selecting a second processor board/controller board pair comprising a second processor board and the first input-output controller board; and (f) booting the second processor board/ controller board pair.

13. The method of claim 6 further comprising, before step (a), the steps of:

(a-1) identifying a non-responsive processor;

(a-2) selecting a second processor;

(a-3) halting execution of the selected second processor;

(a-4) restarting the non-responsive processor;

(a-5) restarting the selected second processor; and (a-6) copying processor state from the selected second processor to the non-responsive processor.

14. The method of claim 5 wherein step (a-1) comprises the steps of:

monitoring a heartbeat signal from a processor; and identifying the processor as non-responsive based on the heartbeat signal.

15. The method of claim 13 wherein step (a-6) comprises:

comparing between the processor state of the non-responsive processor and the selected halted processor to identify processor state differences; and copying a subset of the processor state of the selected halted processor to the non-responsive processor in order to make the state of the non-responsive processor identical to the state of the selected halted processor.

16. The method of claim 13 wherein step (a-4) comprises rebooting the non-responsive processor.

17. An apparatus for deterministically booting a fault-tolerant system comprising:

at least one processor;

at least one input-output controller module in communication with at least one processor;

a memory element storing a list of processor/module pairs; and a control module in communication with the memory element, the at least one input-output controller module, and at least one processor, wherein the control module retrieves a first processor/input-output controller module pair identifier from the memory element and boots an identified first processor/module pair.

18. The apparatus of claim 17 wherein the control module boots the first processor/controller module pair by initiating execution of a basic input/output system associated with the first processor.

19. The apparatus of claim 17 wherein the memory element comprises a non-volatile memory element.

20. The apparatus of claim 17 wherein the control module detects that the first processor/module pair failed to boot.

21. The apparatus of claim 20 wherein the control module retrieves a second processor/input-output controller module pair identifier from the memory element and boots an identified second processor/module pair.

22. The apparatus of claim 17 wherein the control module detects that a processor is non-responsive, halts execution of the other processors in a plurality of processors, selects a processor from the plurality of halted processors, starts the failed processor, restarts the plurality of halted processors and copies processor state from the selected halted processor to the failed processor.

23. The apparatus of claim 22 wherein the control module copies a subset of the state of the selected halted processor to the non-responsive processor.

24. The apparatus of claim 22 wherein the control module monitors a heartbeat signal transmitted from a processor.

25. The apparatus of claim 22 wherein the control module reboots the non-responsive processor.

26. In a computer comprising at least one hardware component and at least one software component, a method for deterministically booting the system, the method comprising the steps of:

(a) accessing a memory element storing a predetermined list of combinations of hardware components and software components;

(b) choosing a first boot group comprising:
a first hardware component; and
a first software component; and (c) booting said first boot group.

27. The method of claim 26 further comprising the steps of:

(d) booting each of the remaining hardware components; and (e) booting each of the remaining software components.

28. The method of claim 26, wherein the first boot group comprises a processor, an input-output controller module, and a basic input-output system (BIOS).

29. The method of claim 26 further comprising the steps of:

(d) detecting that the first boot group failed to boot;

(e) selecting a second boot group comprising:
a second hardware component; and
a second software component; and (f) booting the second boot group.

30. The method of claim 26 further comprising, before step (a), the steps of:

(a-1) identifying a non-responsive hardware component;

(a-2) selecting a second hardware component;

(a-3) halting execution of the selected second hardware component;

(a-4) restarting the non-responsive hardware component;

(a-5) restarting the selected second hardware component; and (a-6) copying hardware component state from the selected second hardware component to the non-responsive hardware component.

31. The method of claim 30 wherein step (a-1) comprises the steps of:

monitoring a heartbeat signal from a hardware component; and identifying the hardware component as non-responsive based on the heartbeat signal.

32. The method of claim 30 wherein step (a-6) comprises:

comparing between the hardware component state of the non-responsive hardware component and the selected halted hardware component to identify hardware component state differences; and copying a subset of the hardware component state of the selected halted hardware component to the non-responsive hardware component in order to make the state of the non-responsive hardware component identical to the state of the selected halted hardware component.

33. The method of claim 30 wherein step (a-4) comprises rebooting the non-responsive hardware component.

* * * * *

UNITED STATES PATENT AND TRADEMARK OFFICE
CERTIFICATE OF CORRECTION

PATENT NO. : 6,691,225 B1
DATED : February 10, 2004
INVENTOR(S) : Suffin

It is certified that error appears in the above-identified patent and that said Letters Patent is hereby corrected as shown below:

<u>Column 10,</u>
Line 37, delete "claim 6" and insert -- claim 9 --
Line 47, delete "claim 5" and insert -- claim 13 --

Signed and Sealed this

Eleventh Day of May, 2004

JON W. DUDAS
*Acting Director of the United States Patent and Trademark Office*